US012794797B2

(12) United States Patent
Redman et al.

(10) Patent No.: US 12,794,797 B2
(45) Date of Patent: Nov. 10, 2026

(54) SYSTEMS AND METHODS FOR NETWORK MANAGEMENT FOR DISTRIBUTED SIMULATION EXECUTION

(71) Applicant: DK Crown Holdings Inc., Boston, MA (US)

(72) Inventors: Luke Joshua Redman, London (GB); John Taylor McIvor, London (GB); George Alexander Day Griffiths, London (GB)

(73) Assignee: DK Crown Holdings Inc., Boston, MA (US)

( * ) Notice: Subject to any disclaimer, the term of this patent is extended or adjusted under 35 U.S.C. 154(b) by 35 days.

(21) Appl. No.: 19/091,300

(22) Filed: Mar. 26, 2025

(65) Prior Publication Data

US 2026/0303506 A1 Oct. 1, 2026

(51) Int. Cl.

| | |
|---|---|
| ***H04L 43/0811*** | (2022.01) |
| ***H04L 43/065*** | (2022.01) |
| ***H04L 43/55*** | (2022.01) |
| ***H04L 67/568*** | (2022.01) |
| *G06F 9/44* | (2018.01) |
| *G06F 11/30* | (2006.01) |
| *G06F 15/177* | (2006.01) |
| *G06F 17/18* | (2006.01) |

(52) U.S. Cl.
CPC ............ *H04L 43/55* (2022.05); *H04L 43/065* (2013.01); *H04L 67/568* (2022.05)

(58) Field of Classification Search
CPC ..... H04L 43/55; H04L 67/568; H04L 43/065; H04L 43/0811; G06F 9/44; G06F 15/177; G06F 17/18; G06F 11/30
See application file for complete search history.

(56) References Cited

U.S. PATENT DOCUMENTS

2010/0153928 A1* 6/2010 Livshits .............. G06F 11/3461 717/135
2023/0216773 A1* 7/2023 Jiang ..................... H04L 41/122 370/252

* cited by examiner

*Primary Examiner* — Jude Jean Gilles
(74) *Attorney, Agent, or Firm* — Foley & Lardner LLP

(57) ABSTRACT

Systems and methods for network management of simulations based on network communications are disclosed are disclosed. A system can maintain a first set of simulation results of a first set of simulations executed at a first time. The first set of simulation results can be generated in response to a first network communication. The system can determine, based on a second network communication, that re-simulation for an event is to occur. Responsive to this determination, the system can identify a subset of the first set of simulation results based on the second network communication, where the subset identifies at least one characteristic that is to be cached according to at least one criterion. The system can execute a number of second simulations for the event, where the number is determined based on a number of simulation results in the subset.

20 Claims, 6 Drawing Sheets

SYSTEMS AND METHODS FOR NETWORK MANAGEMENT FOR DISTRIBUTED SIMULATION EXECUTION

BACKGROUND

Providing synchronized information is useful for networked computing environments including multiple computing systems. Information can be shared using different formats or protocols. It is challenging to provide synchronized information efficiently in computing systems via computer networks having different types of computing devices.

SUMMARY

The systems and methods described herein provide techniques for synchronized information sharing between multiple computing devices to facilitate the management of automatic simulation execution. Due to the real-time nature of network events, it can be challenging to coordinate execution of various network applications based on information from multiple computing devices, including between servers and client devices that access those servers. The systems and methods address these and other technical challenges relating to network-based simulation execution by maintaining data structures for the execution of simulations in environments with numerous computing devices, including large-scale network infrastructures or distributed computing systems. The various techniques described herein improve the capacity of computing devices to process dynamic changes in simulation parameters, thereby improving the overall performance and responsiveness of network management and simulation execution processes.

At least one aspect relates to a system. The system can include one or more processors coupled to non-transitory memory. The system can maintain a first set of simulation results of a first set of simulations executed at a first time. The first set of simulation results can be generated in response to a first network communication. The system can determine that re-simulation for an event is to occur based on a second network communication. The system can identify a subset of the first set of simulation results based on the second network communication, where the subset identifies at least one characteristic that is to be cached according to at least one criterion. The system can execute a number of second simulations for the event, where the number is determined based on the number of simulation results in the subset.

In some implementations, the system can generate a second set of simulation results including the subset of the first set of simulation results and results of the second simulations. In some implementations, the system can receive a network request for a set of values corresponding to the event. In some implementations, the system can generate the set of values based on the second simulations. In some implementations, the first network communication or the second network communication are received via a client device. In some implementations, the subset is stored in association with a flag indicating that each simulation result of the subset is to be cached.

In some implementations, the system can delete the first set of simulations not included in the subset upon executing the second simulations. In some implementations, the system can identify each simulation result of the first set of simulation results that identify a simulated outcome that corresponds to the at least one criterion for inclusion in the subset. In some implementations, the system can determine the number of the second simulations to execute based on a difference between a number of results in the first set of simulation results and the number of results in the subset. In some implementations, the system can execute a predetermined number of the first set of simulations. In some implementations, the system can determine that the first network communication includes an indication to execute the first set of simulations.

At least one aspect is related to a method. The method can include maintaining a first set of simulation results of a first set of simulations executed at a first time. The first set of simulation results can be generated in response to a first network communication. The method can include determining that re-simulation for an event is to occur based on a second network communication. The method can include identifying a subset of the first set of simulation results based on the second network communication, where the subset identifies at least one characteristic that is to be cached according to at least one criterion. The method can include executing a number of second simulations for the event, where the number is determined based on the number of simulation results in the subset.

In some implementations, the method can include generating a second simulation result including the subset of the first set of simulation results and results of the second simulations. In some implementations, the method can include receiving a network request for a set of values corresponding to the event. In some implementations, the method can include generating the set of values based on the second simulations. In some implementations, the first network communication or the second network communication are received via a client device. In some implementations, the method can include storing the subset in association with a flag indicating that each simulation result of the subset is to be cached.

In some implementations, the method can include deleting the first set of simulations not included in the subset upon executing the second simulations. In some implementations, the method can include identifying each simulation result of the first set of simulation results that identify a simulated outcome that corresponds to the at least one criterion for inclusion in the subset. In some implementations, the method can include determining the number of the second simulations to execute based on a difference between a number of results in the first set of simulation results and the number of results in the subset. In some implementations, the method further includes executing a predetermined number of the first set of simulations. In some implementations, the method can include determining that the first network communication includes an indication to execute the first set of simulations.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification. Aspects can be combined, and it will be readily appreciated that features described in the context of one aspect of the invention can be combined with other aspects. Aspects can be implemented in any convenient form, for example, by appropriate computer programs, which may be carried on appropriate carrier media (computer readable media), which may be tangible carrier media (e.g., disks) or intangible carrier media (e.g., communications signals). Aspects may also be implemented using any suitable apparatus, which may take the form of programmable computers running computer programs arranged to implement the aspect. As used in the specification and in the claims, the singular form of 'a,' 'an,' and 'the' include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Below are detailed descriptions of various concepts related to, and implementations of, techniques, approaches, methods, apparatuses, and systems for implementing network management for distributed simulation execution. The various concepts introduced above and discussed in greater detail below may be implemented in any of numerous ways, as the described concepts are not limited to any particular manner of implementation. Examples of specific implementations and applications are provided primarily for illustrative purposes.

For purposes of reading the description of the various implementations below, the following descriptions of the sections of the Specification and their respective contents may be helpful. Section A describes a network environment and computing environment to implement embodiments described herein. Section B describes systems and methods for network management of distributed simulation execution.

A. Computing and Network Environment

Figure 1A:
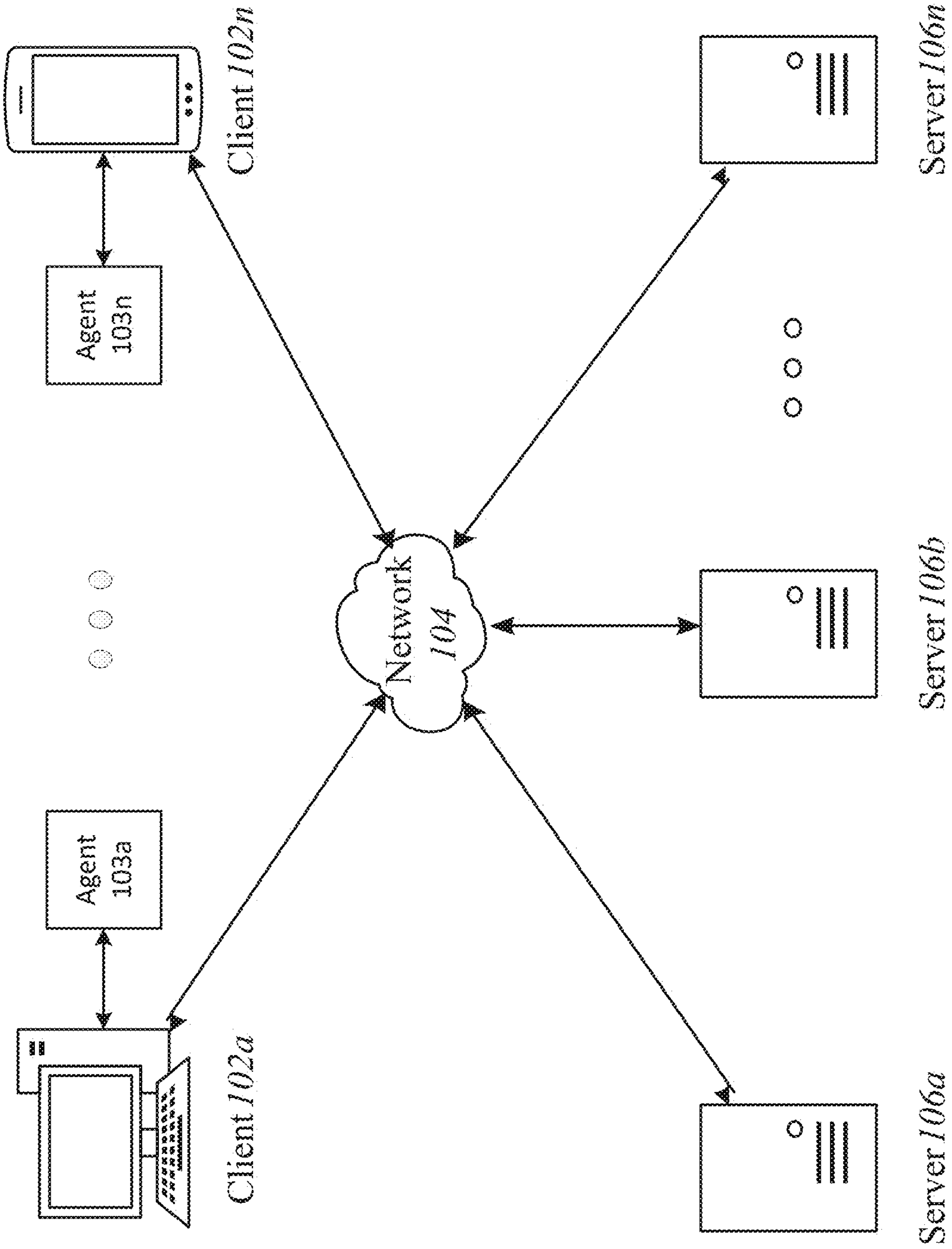
FIG. 1A is a block diagram depicting an embodiment of a network environment comprising a client device in communication with a server device.

Referring to FIG. 1A, an embodiment of a network environment is depicted for synchronizing data structures in computer networks and distributed computing environments. In brief overview, the network environment includes one or more clients 102*a*-102*n* (also generally referred to as local machine(s) 102, client(s) 102, client node(s) 102, client machine(s) 102, client computer(s) 102, client device(s) 102, endpoint(s) 102, or endpoint node(s) 102) in communication with one or more agents 103*a*-103*n* and one or more servers 106*a*-106*n* (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102*a*-102*n*.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel, or satellite band. The wireless links may also include any cellular network standards used to communicate among mobile devices, including standards that qualify as 1G, 2G, 3G, 4G, or 5G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods, e.g., FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN) (e.g., Intranet), a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm 38 (not shown) or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or remote machines 106 can operate according to one type of operating system platform (e.g., WINDOWS NT, manufactured by Microsoft Corp. of Redmond, Washington), while one or more of the other servers 106 can operate according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks 104. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, California; the Xen hypervisor, an open source product whose development is overseen by Citrix Systems, Inc.; the HYPER-V hypervisors provided by Microsoft, or others. Hosted hypervisors may run within an operating system on a second software level. Examples of hosted hypervisors may include VMware Workstation and VIRTUALBOX.

Management of the machine farm 38 may be decentralized. For example, one or more servers 106 may comprise components, subsystems, and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes 106 may be in the path between any two communicating servers.

Figure 1B:
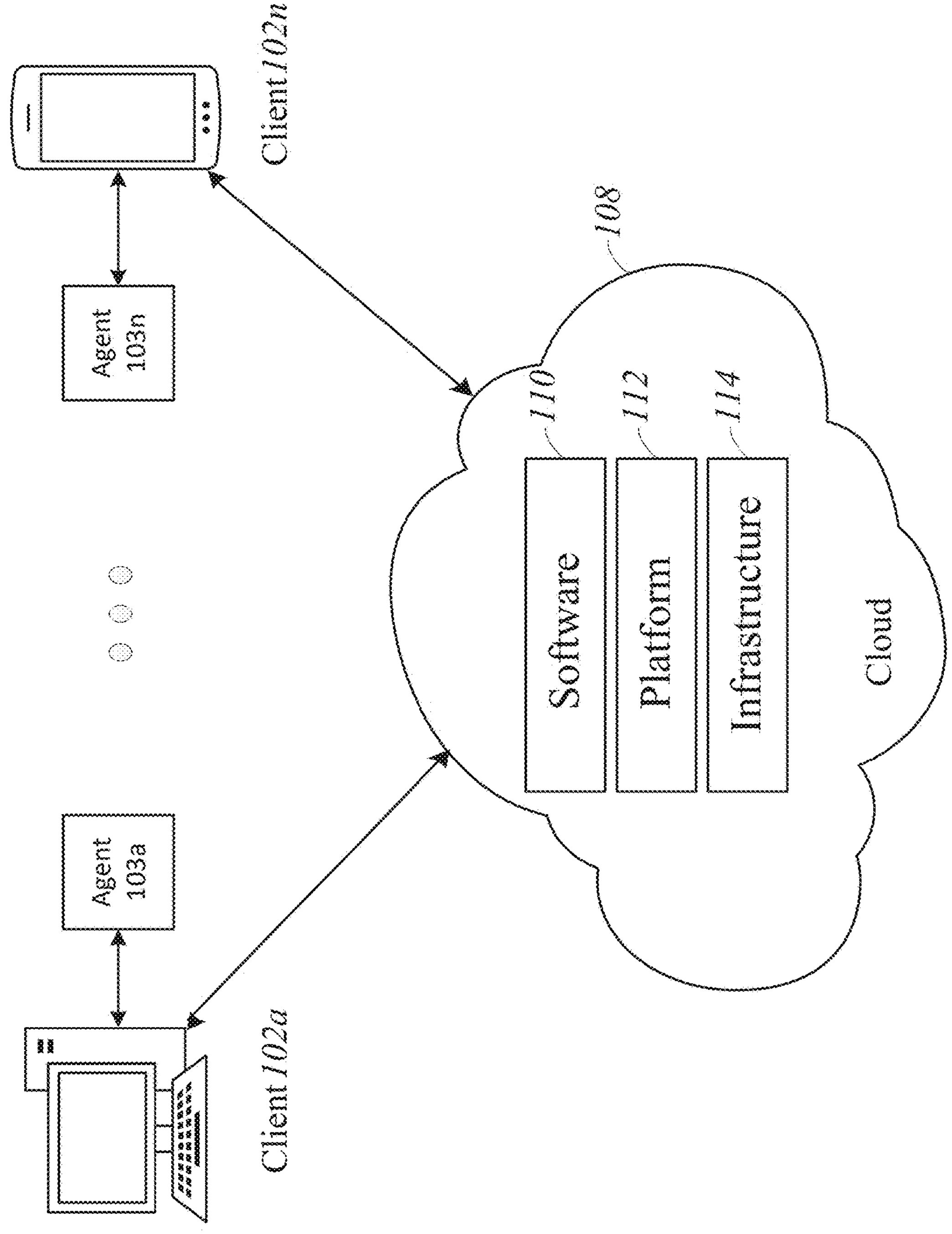
FIG. 1B is a block diagram depicting a cloud computing environment comprising a client device in communication with cloud service providers.

Referring to FIG. 1B, a cloud computing environment is depicted for synchronizing data structures in computer networks and distributed computing environments. A cloud computing environment may provide client 102 with one or more resources provided by a network environment. The cloud computing environment may include one or more clients 102*a*-102*n*, in communication with respective agents 103*a*-103*n* and with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms, or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds 108 may be connected to the servers 106 over a public network 104. Private clouds 108 may include private servers 106 that are physically maintained by clients 102 or owners of clients. Private clouds 108 may be connected to the servers 106 over a private network 104. Hybrid clouds 108 may include both the private and public networks 104 and servers 106.

The cloud 108 may also include a cloud based delivery, e.g., Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington; RACKSPACE CLOUD provided by Rackspace US, Inc., of San Antonio, Texas; Google Compute Engine provided by Google Inc. of Mountain View, California; or RIGHTSCALE provided by RightScale, Inc., of Santa Barbara, California. PaaS providers may offer functionality provided by IaaS, including, e.g., storage, networking, servers, or virtualization, as well as additional resources such as, e.g., the operating system, middleware, or runtime resources. Examples of PaaS include WINDOWS AZURE provided by Microsoft Corporation of Redmond, Washington; Google App Engine provided by Google Inc.; and HEROKU provided by Heroku, Inc., of San Francisco, California. SaaS providers may offer the resources that PaaS provides, including storage, networking, servers, virtualization, operating system, middleware, or runtime resources. In some embodiments, SaaS providers may offer additional resources, including, e.g., data and application resources. Examples of SaaS include GOOGLE APPS provided by Google Inc.; SALESFORCE provided by Salesforce.com Inc. of San Francisco, California; or OFFICE 365 provided by Microsoft Corporation. Examples of SaaS may also include data storage providers, e.g., DROPBOX provided by Dropbox, Inc., of San Francisco, California; Microsoft SKYDRIVE provided by Microsoft Corporation; Google Drive provided by Google Inc.; or Apple ICLOUD provided by Apple Inc. of Cupertino, California.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages, including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g., GOOGLE CHROME, Microsoft INTERNET EXPLORER, or Mozilla Firefox provided by Mozilla Foundation of Mountain View, California). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
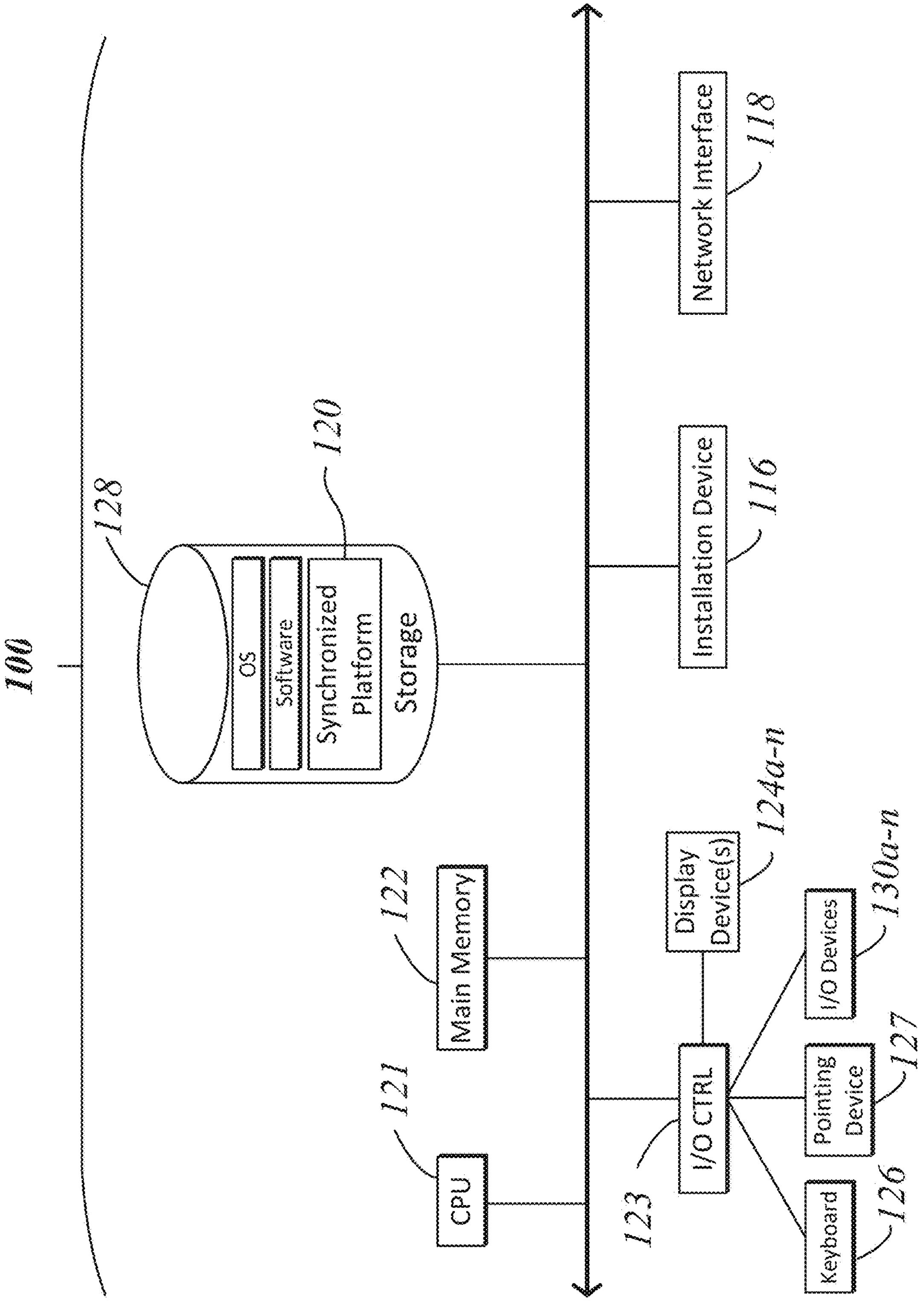
FIGS. 1C and 1D are block diagrams depicting embodiments of computing devices useful in connection with the methods and systems described herein.
Figure 1D:
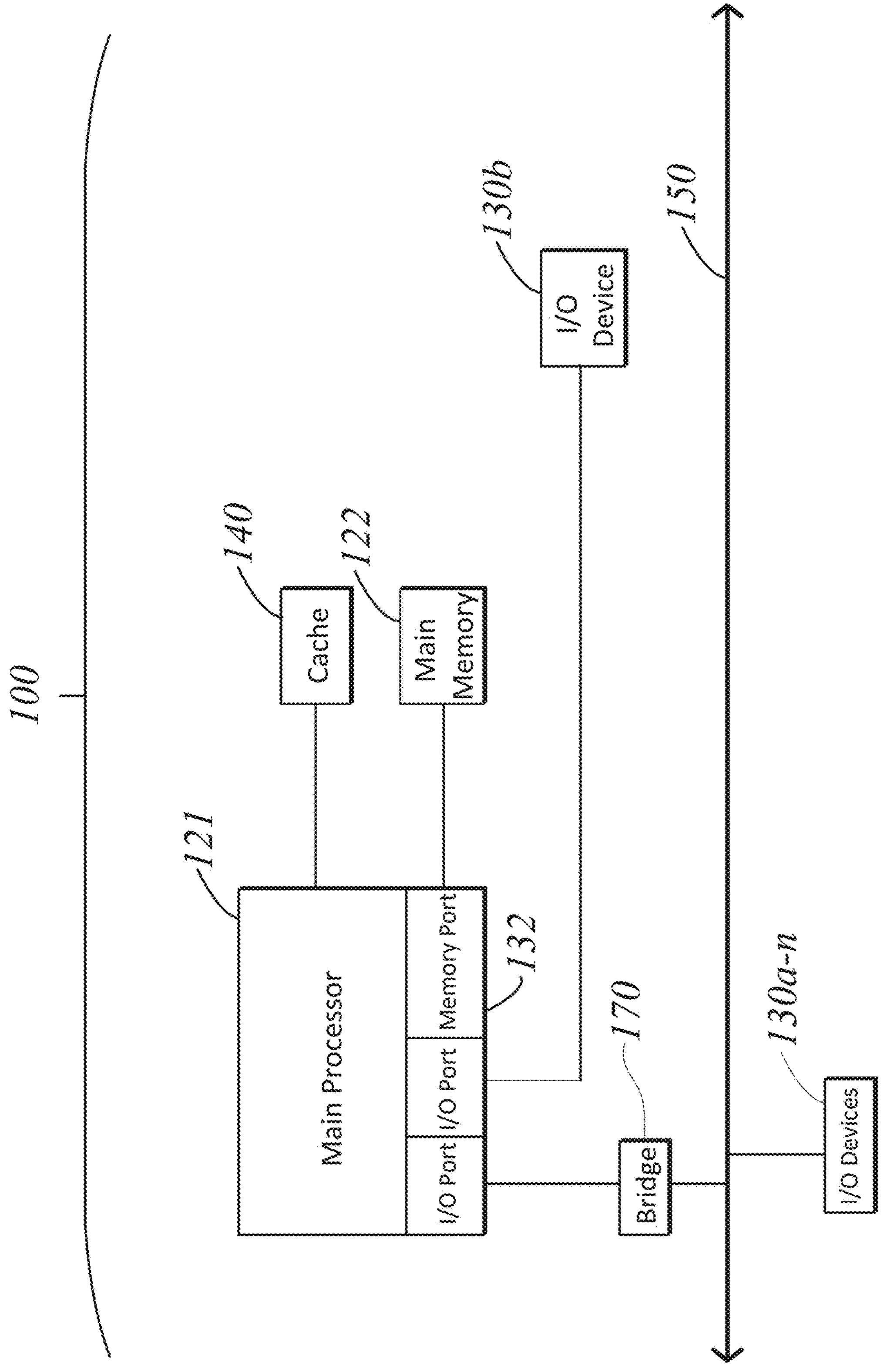

The client 102 and server 106 may be deployed as and/or executed on any type and form of computing device, e.g., a computer, network device or appliance capable of communicating on any type and form of network and performing the operations described herein. FIGS. 1C and 1D depict block diagrams of a computing device 100 useful for practicing an embodiment of the client 102 or a server 106, for synchronizing data structures in computer networks and distributed computing environments. As shown in FIGS. 1C and 1D, each computing device 100 includes a central processing unit 121 and a main memory unit 122. As shown in FIG. 1C, a computing device 100 may include a storage device 128, an installation device 116, a network interface 118, an I/O controller 123, display devices 124*a*-124*n*, a keyboard 126, and a pointing device 127, e.g., a mouse. The storage device 128 may include, without limitation, an operating system, software, and synchronized platform 120, which can implement any of the features of the data processing system 205 described herein below in conjunction with FIG. 2. As shown in FIG. 1D, each computing device 100 may also include additional optional elements, e.g., a memory port 132, a bridge 170, one or more input/output devices 130*a*-130*n* (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g., those manufactured by Intel Corporation of Mountain View, California; those manufactured by Motorola Corporation of Schaumburg, Illinois; the ARM processor and TEGRA system on a chip (SoC) manufactured by Nvidia of Santa Clara, California; the POWER7 processor manufactured by International Business Machines of White Plains, New York; or those manufactured by Advanced Micro Devices of Sunnyvale, California. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of a multi-core processors include the AMD PHENOM IIX2, INTEL CORE i5, INTEL CORE i7, and INTEL CORE i9.

Main memory unit 122 may include one or more memory chips capable of storing data and allowing any storage location to be directly accessed by the microprocessor 121. Main memory unit 122 may be volatile and faster than storage 128 memory. Main memory units 122 may be dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 132. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130*b* or other processors 121' via HYPERTRANSPORT, RAPIDIO, or INFINIBAND communications technology. FIG. 1D also depicts an embodiment in which local busses and direct communication are mixed: the processor

121 communicates with I/O device 130*a* using a local interconnect bus 150 while communicating with I/O device 130*b* directly.

A wide variety of I/O devices 130*a*-130*n* may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex cameras (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130*a*-130*n* may include a combination of multiple input or output devices, including, e.g., Microsoft KINECT, Nintendo Wiimote for the WII, Nintendo WII U GAMEPAD, or Apple IPHONE. Some devices 130*a*-130*n* allow gesture recognition inputs through combining some of the inputs and outputs. Some devices 130*a*-130*n* provide for facial recognition which may be utilized as an input for different purposes including authentication and other commands. Some devices 130*a*-130*n* provides for voice recognition and inputs, including, e.g., Microsoft KINECT, SIRI for IPHONE by Apple, Google Now, or Google Voice Search.

Additional devices 130*a*-130*n* have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality, including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130*a*-130*n*, display devices 124*a*-124*n* or group of devices may be augmented reality devices. The I/O devices 130*a*-130*n* may be controlled by an I/O controller 123 as shown in FIG. 1C. The I/O controller 123 may control one or more I/O devices 130*a*-130*n*, such as, e.g., a keyboard 126 and a pointing device 127, e.g., a mouse or optical pen. Furthermore, an I/O device 130 may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g., a USB bus, a SCSI bus, a FireWire bus, an Ethernet bus, a Gigabit Ethernet bus, a Fibre Channel bus, or a Thunderbolt bus.

In some embodiments, display devices 124*a*-124*n* may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g., stereoscopy, polarization filters, active shutters, or autostereoscopic. Display devices 124*a*-124*n* may also be a head-mounted display (HMD). In some embodiments, display devices 124*a*-124*n* or the corresponding I/O controllers 123 may be controlled through or have hardware support for OPENGL or DIRECTX API or other graphics libraries.

In some embodiments, the computing device 100 may include or connect to multiple display devices 124*a*-124*n*, which each may be of the same or different type and/or form. As such, any of the I/O devices 130*a*-130*n* and/or the I/O controller 123 may include any type and/or form of suitable hardware, software, or combination of hardware and software to support, enable or provide for the connection and use of multiple display devices 124*a*-124*n* by the computing device 100. For example, the computing device 100 may include any type and/or form of video adapter, video card, driver, and/or library to interface, communicate, connect, or otherwise use the display devices 124*a*-124*n*. In one embodiment, a video adapter may include multiple connectors to interface to multiple display devices 124*a*-124*n*. In other embodiments, the computing device 100 may include multiple video adapters, with each video adapter connected to one or more of the display devices 124*a*-124*n*. In some embodiments, any portion of the operating system of the computing device 100 may be configured for using multiple displays 124*a*-124*n*. In other embodiments, one or more of the display devices 124*a*-124*n* may be provided by one or more other computing devices 100*a* or 100*b* connected to the computing device 100, via the network 104. In some embodiments software may be designed and constructed to use another computer's display device as a second display device 124*a* for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124*a*-124*n*.

Referring again to FIG. 1C, the computing device 100 may comprise a storage device 128 (e.g., one or more hard disk drives or redundant arrays of independent disks) for storing an operating system or other related software, and for storing application software programs such as any program related to the synchronized platform 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via an I/O device 130 that provides an external bus. Some storage device 128 may connect to the computing device 100 via the network interface 118 over a network 104, including, e.g., the Remote Disk for MACBOOK AIR by Apple. Some computing devices 100 may not require a non-volatile storage device 128 and may be thin clients or zero clients 102. Some storage device 128 may also be used as an installation device 116, and may be suitable for installing software and programs. Additionally, the operating system and the software 110 can be run from a bootable medium, for example, a bootable CD, e.g., KNOPPIX, a bootable CD for GNU/Linux that is available as a GNU/Linux distribution from knoppix.net.

Computing device 100 may also install software 110 or application from an application distribution platform 112. Examples of application distribution platforms 112 include the App Store for iOS provided by Apple, Inc.; the Mac App Store provided by Apple, Inc.; GOOGLE PLAY for Android OS provided by Google Inc.; Chrome Webstore for CHROME OS provided by Google Inc.; and Amazon Appstore for Android OS and KINDLE FIRE provided by Amazon.com, Inc. An application distribution platform 112 may facilitate installation of software 110 on a client device 102. An application distribution platform 112 may include a repository of applications on a server 106 or a cloud 108, which the clients 102*a*-102*n* may access over a network 104. An application distribution platform 112 may include an application developed and provided by various developers. A user of a client device 102 may select, purchase, and/or download an application via the application distribution platform 112.

Furthermore, the computing device 100 may include a network interface 118 to interface to the network 104 through a variety of connections, including, but not limited to, standard telephone lines, LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol, e.g., Secure Socket Layer (SSL) or Transport Layer Security (TLS), or the Citrix Gateway Protocol manufactured by Citrix Systems, Inc., of Ft. Lauderdale, Florida. The network interface 118 may comprise a built-in network adapter, network interface card, PCMCIA network card, EXPRESSCARD network card, card bus network adapter, wireless network adapter, USB network adapter, modem, or any other device suitable for interfacing between the computing device 100 and any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to, WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Washington; MAC OS and iOS, manufactured by Apple, Inc., of Cupertino, California; and Linux, a freely-available operating system, e.g., Linux Mint distribution ("distro") or Ubuntu, distributed by Canonical Ltd. of London, United Kingdom; or Unix or other Unix-like derivative operating systems; and Android, designed by Google, of Mountain View, California, among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, a PLAYSTATION 4, PLAYSTATION 5, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, NINTENDO WII U, or a NINTENDO SWITCH device manufactured by Nintendo Co., Ltd., of Kyoto, Japan, an XBOX 360, an XBOX ONE, an XBOX ONE S, an XBOX ONE X, an XBOX SERIES S, or an XBOX SERIES X, manufactured by the Microsoft Corporation of Redmond, Washington.

In some embodiments, the computing device 100 is a digital audio player such as the Apple IPOD, IPOD Touch, and IPOD NANO lines of devices, manufactured by Apple Computer of Cupertino, California. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats, including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet, e.g., the IPAD line of devices by Apple; GALAXY TAB family of devices by Samsung; or KINDLE FIRE, by Amazon.com, Inc., of Seattle, Washington. In other embodiments, the computing device 100 is an eBook reader, e.g., the KINDLE family of devices by Amazon.com, or NOOK family of devices by Barnes & Noble, Inc., of New York City, New York.

In some embodiments, the communications device 102 includes a combination of devices, e.g., a smartphone combined with a digital audio player or portable media player. For example, one of these embodiments is a smartphone, e.g., the IPHONE family of smartphones manufactured by Apple, Inc.; a Samsung GALAXY family of smartphones manufactured by Samsung, Inc.; or a Motorola DROID family of smartphones. In yet another embodiment, the communications device 102 is a laptop or desktop computer equipped with a web browser and a microphone and speaker system, e.g., a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 are monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Network Management of Distributed Simulation Execution

The techniques described herein relate to systems and methods for improving the execution and management of simulations executed via networked or distributed computing environments. Such simulations can involve computer-implemented processes that can generate or update predictions or assessments of various characteristics provided, for example, via network communications. To accurately capture the dynamic nature of such simulated characteristics, simulations must be re-executed in response to varying conditions or changes, which may be received in or detected from various network communications.

Current approaches to managing the execution of such simulations significant challenges due to the requirement to frequently re-run full sets of simulations whenever network communications indicate a change to a parameter for the simulation and/or related characteristics. Such approaches can result in high computational overhead, as each incremental change can necessitate a complete re-execution of the simulation set. Consequently, there can be delays in providing simulated characteristics via network, introducing potential inaccuracies or latency that can affect down-stream network applications that use the results of the simulations.

The techniques described herein address these challenges by introducing selective caching and/or reuse of results generated via prior simulations. In doing so, the techniques can involve identifying subsets of previously computed simulations that remain valid even based on changes in detected in conditions/characteristics received via network communications. Valid results can be flagged or marked for caching to avoid replication the same outcomes in subsequent iterations of simulation execution.

To implement these techniques, the system can dynamically determine the number of additional simulations required following a detected change in conditions received via network communications. The determinations can involve calculating the difference between the new target count of simulations needed to capture a current simulation state and the number of relevant, cached simulation results. By executing the specific number of new simulations to capture a threshold set of simulation results, the techniques described herein avoid an "all or nothing" approach of executing entire simulation sets, thereby reducing redundant computations or improving responsiveness. The techniques described herein provide a technical improvement over existing approaches by reducing computational overhead, avoiding unnecessary re-simulations, and reducing latency in providing updated simulation results via network communications.

Figure 2:
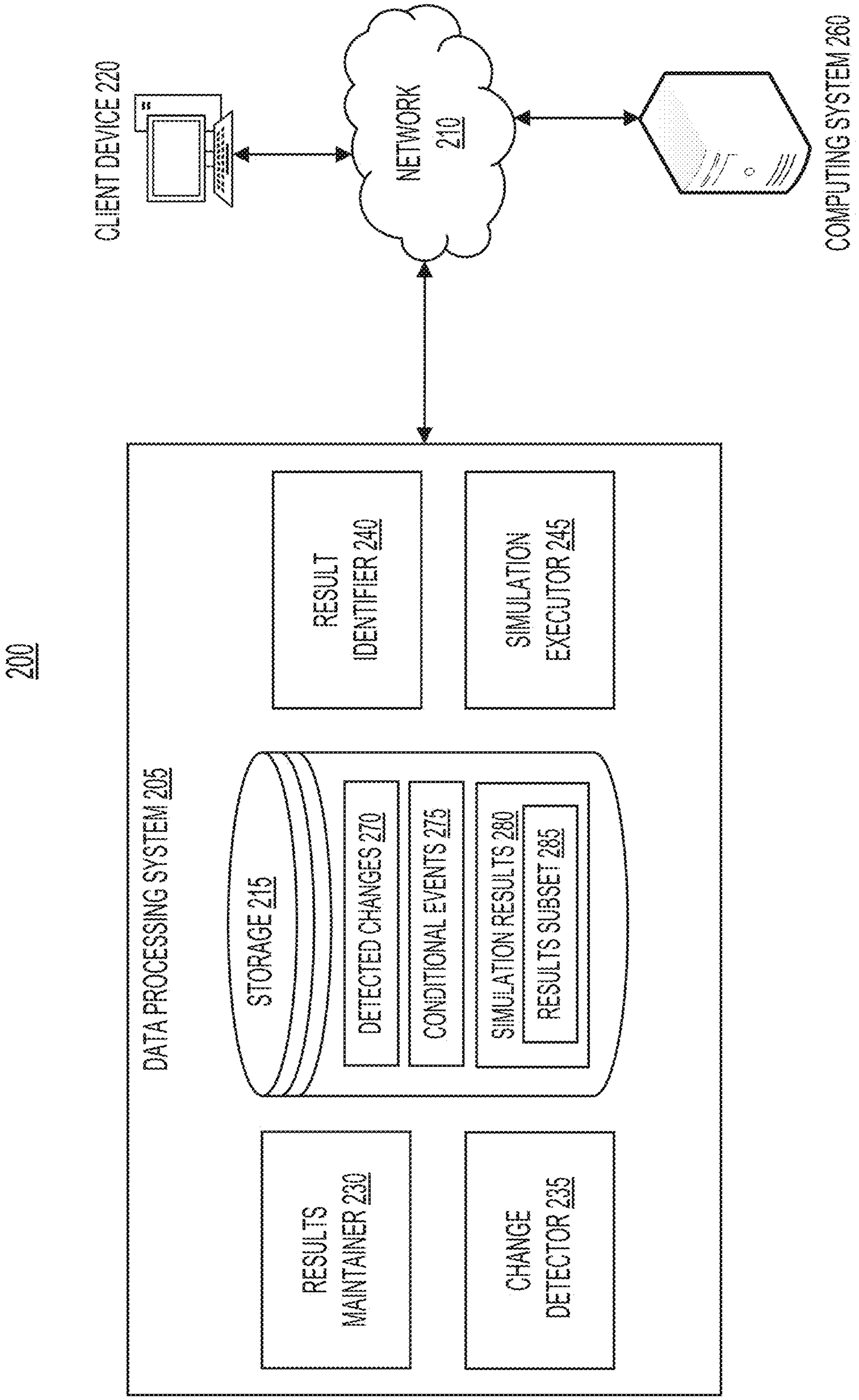
FIG. 2 is a block diagram of an example system for simulation reuse, in accordance with one or more implementations.

Referring now to FIG. 2, illustrated is a block diagram of an example system 200 for simulations reuse, in accordance with one or more implementations. The system 200 can include at least one data processing system 205, at least one network 210, at least one client device 220, and at least one computing system 260. The data processing system 205 can include a result maintainer 230, a change detector 235, a result identifier 240, a simulation executor 245, and at least one storage 215. The storage 215 can include detected changes 270, conditional events 275, and simulation results 280. The simulation results 280 can include results subset 285. Although shown here as internal to the data processing system 205, the storage 215 can be external to the data processing system 205, for example, as a part of a cloud computing system or an external computing device in communication with the devices (e.g., the data processing system 205, the client device 220, computing system 260, etc.) of the system 200 via the network 210.

Each of the components (e.g., the result maintainer 230, the change detector 235, the result identifier 240, the simulation executor 245, and the storage 215, etc.) of the system 200 can be implemented using the hardware components or a combination of software with the hardware components of a computing system, such as any other computing system described herein. Each of the components of the data processing system 205 can perform the functionalities detailed herein.

The data processing system 205 can include at least one processor and a memory (e.g., a processing circuit). The memory can store processor-executable instructions that, when executed by a processor, cause the processor to perform one or more of the operations described herein. The processor may include a microprocessor, an application-specific integrated circuit (ASIC), a field-programmable gate array (FPGA), a graphics processing unit (GPU), a tensor processing unit (TPU), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The data processing system 205 can include one or more computing devices or servers that can perform various functions as described herein.

In some implementations, the data processing system 205 may communicate with the client device 220 and/or computing system 260, for example, to provide probabilities or odds for sporting events, via the network 210. The data processing system 205 may execute simulations of live events and sporting events. The data processing system 205 may communicate with the client device 220 and/or computing system 260 to generate probabilities or odds for wagers for live events. Once the data processing system 205 generates probabilities or odds for wagers for live events based on the simulation results, the data processing system 205 can transmit the wagers to client device 220 and/or computing system 260 via the network 210. In one example, the data processing system 205 can be or can include an application server or webserver, which may include software modules allowing various computing devices (e.g., the client device 220, etc.) to access or manipulate data stored by the data processing system 205. In some implementations, to determine odds from probabilities for a wager of a live event, margin can be added to the calculated probabilities. The margin can be an adjustment to the initial predicted probabilities to provide odds that incorporate the commission of the bookmaker to ensure that the odds offered are slightly less favorable than the true probabilities would suggest.

The network 210 can include computer networks such as the Internet, local, wide, metro, or other area networks, intranets, satellite networks, other computer networks such as voice or data mobile phone communication networks, or combinations thereof. The data processing system 205 of the system 200 can communicate via the network 210 with one or more computing devices, such as the one or more client device 220 or the computing system 260. The network 210 may be any form of computer network that can relay information between the data processing system 205, the one or more client device 220, one or more computing systems 260, and one or more information sources, such as web servers or external databases, amongst others. In some implementations, the network 210 may include the Internet and/or other types of data networks, such as a local area network (LAN), a wide area network (WAN), a cellular network, a satellite network, or other types of data networks. The network 210 may also include any number of computing devices (e.g., computers, servers, routers, network switches, etc.) that are configured to receive or transmit data within the network 210.

The network 210 may further include any number of hardwired or wireless connections. Any or all of the computing devices described herein (e.g., the data processing system 205, the one or more client device 220, the computing system 200, etc.) may communicate wirelessly (e.g., via Wi-Fi, cellular communication, radio, etc.) with a transceiver that is hardwired (e.g., via a fiber optic cable, a CAT5 cable, etc.) to other computing devices in the network 210. Any or all of the computing devices described herein (e.g., the data processing system 205, the one or more client device 220, the computer system 200, etc.) may also communicate wirelessly with the computing devices of the network 210 via a proxy device (e.g., a router, network switch, or gateway).

The client device 220 can include at least one processor and a memory (e.g., a processing circuit). The memory can store processor-executable instructions that, when executed by the processor, cause the processor to perform one or more of the operations described herein. The processor can include a microprocessor, an ASIC, an FPGA, a GPU, a TPU, etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions can include code from any suitable computer programming language. The client device 220 can include at least one computing device or server that can perform various operations as described herein.

The client device 220 can be a smartphone device, a mobile device, a personal computer, a laptop computer, a television device, a broadcast receiver device (e.g., a set-top box, a cable box, a satellite receiver box, etc.), or another type of computing device. The client device 220 can be implemented hardware or a combination of software and hardware. The client device 220 can include a display or display portion. The display can include a touchscreen display, a display portion of a television, a display portion of a computing device, a monitor, a GUI, or another type of interactive display (e.g., a touchscreen, a graphical interface, etc.) and one or more I/O devices (e.g., a touchscreen, a mouse, a keyboard, digital keypad). The client device 220 can include or be identified by a device identifier, which can be specific to each respective client device 220. The device identifier can include a script, code, label, or marker that identifies a particular client device 220. In some implementations, the device identifier can include a string or plurality of numbers, letters, characters, or any combination numbers, letters, and characters. In some embodiments, each client device 220 can have a unique device identifier.

In some implementations, in response to interactions with corresponding user interface elements, the application executing on a client device 220 can transmit information via a graphical user interface provider 230, such as odds for sporting events, parameters 275, and game statistics (e.g., goals scored, possession percentage, number of shots on goal, pass accuracy, number of corners, fouls committed, offsides, saves by the goalkeeper). The graphical user interface provider 230 can provide the odds for sporting events by running requests on a client device, using a range of game-related inputs. The odds can be queries for predicting outcomes of sporting events. The requests can be hypertext transfer protocol (HTTP or HTTPS) request messages, file transfer protocol messages, email messages, text messages, or any other type of message that can be transmitted via the network 210.

In some implementations, the client device 220 can participate in the process of generating odds or predictions for live events by initiating and coordinating requests. The client device 220 can send requests (e.g., probabilities or odds requests) to the data processing system 205 for odds or predictions on live events, in some implementations. The requests can include criteria or conditions that the user wants to be factored into the probabilities or odds generation process. For example, a client device 220 can request probabilities or odds for a football match while specifying various input data to generate the probabilities or odds, such as game state information, weather conditions, or historical performance data.

In some implementations, one or more client devices 220 can establish one or more communication sessions with the data processing system 205. A communication session can include a channel or connection between the data processing system 205 and a respective client device 220. The one or more communication sessions can each include an application session (e.g., virtual application), an execution session, a desktop session, a hosted desktop session, a terminal services session, a browser session, a remote desktop session, a URL session, or a remote application session. Each communication session can include encrypted or secure sessions, which can include an encrypted file, encrypted data, or traffic.

In some implementations, the computing system 260 can include both hardware and software components. The computing system 260 can perform functions of the client device 220. The computing system 260 can include one or more processors, memory modules, storage devices, and network interfaces. The computing system 260 can communicate with other system components via the network 210. The network 210 can allow the computing system 260 to receive updates about live events and transmit the updates to the data processing system 205. The computing system 260 can include personal computers, servers, laptops, smartphones, tablets, mainframes, supercomputers, embedded systems, cloud computing systems, gaming consoles, and wearable devices.

The computing system 260 can monitor feeds of live events, such as sporting events. The monitoring can be achieved through connections with various data sources that can provide real-time updates. The data sources can include sports data feeds, financial tickers, social media streams, sports outlets, and news outlets. When data from the feeds of live events is received, the computing system 260 can analyze and filter the information to identify relevant changes or updates in the live events (e.g., parsing data or applying algorithms to detect significant events). The computing system 260 can communicate relevant updates in the live events to the data processing system 205 via network 210. The data processing system 205 can send requests to the computing system 260 to track live events. For example, if data processing system 205 is simulating and generating odds for soccer matches, the data processing system 205 may request real-time updates on soccer games from the computing system 260. One or more computing systems 260 may maintain or otherwise access a feed of event data as live events unfold. As such, the data processing system 205 can communicate with the one or more computing systems 260 to retrieve up-to-date information on changes in live events as they occur (e.g., which may be stored or otherwise utilized to generate one or more detected changes 270, as described in further detail herein).

In some implementations, the storage 215 can be a computer-readable memory that can store or maintain any of the information described herein. The storage 215 can store or maintain one or more data structures, which may contain, index, or otherwise store each of the values, pluralities, sets, variables, vectors, numbers, or thresholds described herein. The storage 215 can be accessed using one or more memory addresses, index values, or identifiers of any item, structure, or region maintained in the storage 215. The storage 215 can be accessed by the components of the data processing system 205, or any other computing device (e.g., client device 220, computing system 260, etc.) described herein, via the network 210. In some implementations, the storage 215 can be internal to the data processing system 205. In some implementations, the storage 215 can exist external to the data processing system 205 and may be accessed via the network 210. The storage 215 can be distributed across many different computer systems or storage elements and may be accessed via the network 210 or a suitable computer bus interface. The data processing system 205 can store, in one or more regions of the memory of the data processing system 205, or in the storage 215, the results of any or all computations, determinations, selections, identifications, generations, constructions, or calculations in one or more data structures indexed or identified with appropriate values.

Any or all values stored in the storage 215 may be accessed by any computing device described herein, such as the data processing system 205, to perform any of the functionalities or functions described herein. In some implementations, a computing device, such as a client device 220 or the computing system 260, may utilize authentication information (e.g., username, password, email, etc.) to show that the client device 220 or the computing system 260 is authorized to access requested information in the storage 215. The storage 215 may include permission settings that indicate which players, devices, or profiles are authorized to access certain information stored in the storage 215. In some implementations, instead of being internal to the data processing system 205, the storage 215 can form a part of a cloud computing system. In such implementations, the storage 215 can be a distributed storage medium in a cloud computing system and can be accessed by any of the components of the data processing system 205, by the one or more client device 220 or the computing system 260 (e.g., via one or more graphical user interfaces, etc.), or any other computing devices described herein.

The storage 215 can store or maintain one or more detected changes 270. Detected changes 270 can include changes, alterations, or developments that occur during a corresponding live event (e.g., an event that is currently "live," or being carried out, an upcoming event that is to be live at a later time, etc.). For example, detected changes 270 can be any type of change in the state of a corresponding live event that may impact the outcome of the live event (e.g., a live sporting event). In some implementations, the detected changes 270 can include changes weather conditions. Detected changes 270 can include information relating to the state of or changes in various participants of a live event (e.g., athletes participating in a sporting event), such as substitutions, actions, injuries, performance, and decisions of any athletes in a corresponding live event. Detected changes 270 can include information relating to changes in state as provided by decisions of officials and referees for the live event, such as awarding penalties, ruling on plays, giving cards (e.g., red card or yellow card in soccer), among other rulings.

For example, in soccer, one change may be issuance of one or more cards (e.g., red cards), which remove players from a team. Detected changes 270 can include goals scored during a game (e.g., goals in soccer game, touchdowns in football game, or baskets in basketball game). The detected changes 270 may include a state of one or more live events. The live event state data can include dynamic changes such as scores or player actions. The game state data can include static information such as the live event status, player positions, team formations, and strategic configurations at any given moment during the event. The game state can include a snapshot of the live event at specific intervals or timestamps. The snapshot can include any condition or state information relating to the live event.

The storage 215 can store detected changes 270 for multiple live events. Within storage 215, the detected changes 270 for each event can be stored in one or more data structures or containers. The sets of detected changes 270 can be stored based on event type (e.g., different sports), geographical location, or event dates. The sets of detected changes 270 can store up-to-date changes/state of live events. Each set of detected changes 270 can be assigned an identifier that identifies the live event to which it corresponds. The identifier can include a combination of the event date, type, participating teams or players, or a specific alphanumeric code, in some implementations. The metadata for a live event or detected changes 270 can include the event identifier and other relevant descriptors. The metadata for a live event or detected changes 270 can be stored in the storage 215. As live events unfold, the corresponding data in storage 215 can be continuously updated or appended to the detected changes 270, such that the data processing system 205 maintains an up-to-date record of changes in various live events.

Detected changes 270 can be quantified and assigned numerical values. Detected changes 270 can include time of scoring (e.g., minute or second a score is made in the game), scorer identification, and the athlete who scored. Weather conditions of detected changes 270 can include temperature (e.g., degrees Celsius or Fahrenheit), precipitation amount of rainfall or snowfall (e.g., in millimeters or inches), wind speed (e.g., kilometers or miles per hour). humidity (e.g., percentage of moisture in the air). Athletes metrics of detected changes 270 can include number of players substituted in and out during the game; physical actions such as number of sprints, tackles, or jumps; number of injuries; duration of time a player is off the field due to injury; performance metrics such goals scored, assists made, distance covered, shots taken, passes completed, etc. Decisions by officials and referee of detected changes 270 can include number of penalties awarded, number of yellow and red cards issued, number of offside decisions made, and duration and outcome of Video Assistant Referee (VAR) reviews. Detected changes 270 can be stored in tables with rows and columns, time-series databases with each record associated with a timestamp, and in encoding vectors (such as one-hot encoding).

The storage 215 can store or maintain one or more conditional events 275 associated with one or more live events (e.g., current or upcoming sporting events). The conditional events 275 can be stored in one or more data structures. The conditional events 275 can correspond to any action or event that may occur in a live game (e.g., a live event). One example of a conditional event 275 is "who will score the first touchdown in an upcoming football game" (e.g., there can be only one first touchdown scorer). Other types of conditional events 275 are also possible (e.g., which team will score the next point, who will win the game, which player will score the next point, etc.). Any outcome that may occur during a live event on which a wager can be placed can be stored as a respective conditional event 275.

Each conditional event 275 may be generated or predetermined and stored in the storage 215 such that they are accessible by the components of the data processing system 205. In an embodiment, one or more conditional events 275 may be generated based upon one or more conditional event templates for a live event type (e.g., a type of sporting event, etc.). Prior to or during a live event, the data processing system 205 (or any components thereof) may generate one or more conditional events 275 for the upcoming live event by applying one or more templates to the attributes of the upcoming live event (e.g., which athletes are participating in the live event, which teams are playing in the live event, possible outcomes of the live event, etc.). Respective sets of conditional events 275 can be stored in the storage 215 for each live event in association with a respective identifier of the live event. Each set of conditional events 275 can correspond to potential outcomes that may occur during the live event. Some example conditional events 275 that may correspond to an example football game include which athlete will score the first touchdown, which athlete will score the second touchdown, which team will win the game, or which team will have a greater score at halftime, among others. It should be understood that other conditional events 275 are also possible for other types of live events (e.g., baseball games, hockey games, basketball games, other types of live events, etc.). A conditional event 275 can be any type of event or potential outcome on which a wager can be placed. Each conditional event 275, may be any condition of a corresponding event that can have one or more outcomes. Each outcome may correspond to a respective change or respective portion of state data in the detected changes 270. As live events unfold, the data processing system 205 can dynamically determine whether and which outcomes of each conditional event 275 for a live event have occurred by accessing and comparing the conditional events 275 with state data identified, extracted, or determined from the detected changes 270, ensuring that each potential outcome of each conditional event 275 is consistently evaluated against real-time information.

The simulation results 280 can include data generated from the simulations of various one or more live events (e.g., live sporting events). The simulation results 280 can include predicted outcomes of one or more conditional events 275 of a live event. For example, each result of the simulation results 280 can be generated at least partially based on random values, and live event state data, and can identify a respective outcome for each conditional event 275 that has been not yet occurred during the actual live event. The predicted outcomes for the conditional events 275 identified in the simulation results 280 for a live event can be used to generate probabilities or odds for different outcomes by aggregating the outcomes across all simulation results 280 for the live event. For example, probabilities or odds for a given outcome can be generated based on a number of simulation results 280 that identify the outcome as occurring during the live event (e.g., as opposed to not occurring during the live event), divided by the total number of simulations of the live event.

Each simulation used to generate the simulation results 280 may depend partially on an element of randomness, and may be based on various aspects of the particular live event, the teams and athletes participating in the live event, and any other attribute or characteristic that may influence any outcome that may occur during the live event, including any aspect or portion of live event state data. As such, each set of simulation results 280 generated from each simulation may include different outcomes for the conditional events 275 of the simulated live event. An example data structure representation of the simulation results 280 of conditional events 275 of a live event is shown below in Table 2.

TABLE 2

| | Simulation Number | | | | | | | | | |
|---|---|---|---|---|---|---|---|---|---|---|
| | 1 | 2 | 3 | 4 | 5 | 6 | 7 | 8 | 9 | 10 |
| Conditional Event #1 | A | B | C | D | A | B | C | D | A | C |
| Conditional Event #2 | B | B | A | B | A | C | D | A | C | A |

As shown in Table 2 above, the simulation results for a live event may be organized according to various conditional events 275 that having one or more outcomes that may occur during the live event. In Table 2, each simulation 2, 2, 3 . . . corresponds to a respective simulation of the live event, and the values A, B, C, and D correspond to simulated outcomes of the respective conditional event 275 identified in a corresponding row of the table. The components of the data processing system 205 can utilize the simulation results to calculate odds values for different outcomes of one or more conditional events 275. Although only ten simulation results are shown in Table 2, it should be understood that hundreds, thousands, tens of thousands, hundreds of thousands, or millions of simulations may be executed for a live event, with corresponding outcomes for each conditional event 275 that occur in each simulation being recorded as part of the simulation results. Likewise, the example A, B, C, and D outcomes are provided purely for example purposes. It should be understood that any number of potential outcomes can occur for a conditional event 275, and that different conditional events 275 may have different numbers of potential outcomes. Further, a live event may be associated with any number of conditional events 275.

The simulation results 280 can include data such as likelihood of certain players scoring and team-based outcomes like winning or losing. The simulation results 280 can be associated with a probability score or other metrics that quantify the likelihood of each simulated outcome occurring. The data processing system 205 can utilize conditional event templates to generate simulation results for upcoming events, considering factors such as participating athletes and team statistics. As detected changes 270 occur, simulation results 280 can be adjusted in real-time to reflect the current state of the event.

A set of simulation results 280 for a live event can include results generated from a predetermined or dynamically determined number of simulations of the live event, which is determined based on factors including the type of event and the nature of wagers associated with the event. For example, in a basketball game where scoring happens frequently, the data processing system 205 can set the number of simulations to be higher to capture the rapidly changing dynamics of the live event. For a slower-paced event like a golf match, fewer simulations may be required to effectively generate probabilities or odds for the golf match. The number is, in some implementations, not a fixed number, and can be adjusted dynamically by the data processing system 205 in response to certain detected changes 270. For example, if a key player in a soccer match gets injured, the state of the game can require more simulations to accurately reflect the new odds values, given the significant impact of such an event. In response to detecting such conditions, the data processing system 205 can dynamically increase the number of simulations that are to be executed for the live event.

The data processing system 205 can maintain multiple sets of simulation results 280, each set being identified or indexed by a corresponding live event. When detected changes 270 for a live event are detected, such as a sudden change in weather conditions during an outdoor sports event or a strategic timeout in a basketball game, the data processing system 205 can determine whether to re-simulate the live event and execute additional simulations for the live event as described herein. The adjustment in generating simulation results 280 can ensure that the set of simulation results 280 for the live event provide an accurate model of outcomes of conditional events 275 that may occur during the live event.

The results subset 285 (which can also be referred to as subset 285) can represent a selected portion of the set of simulation results 280 for a live event that is identified in response to detecting one or more detected changes 270 corresponding to the live event. The subset 285 can be dynamically selected from a set of simulation results 280 based on the evolving conditions of the event or conditional events 275, such as a key player's performance, weather changes, or other critical in-game developments. Each simulation result in the subset 285 can be flagged, indicating its significance, and can be cached for quick access. Caching can enable the data processing system 205 to efficiently manage and utilize the data, ensuring that the simulation results 280 reflect the current state of the live event and provide real-time insights for decision-making and analysis.

Referring now the operations of the data processing system 205, the results maintainer 230 can maintain one or more sets of simulation results 280 of one or more corresponding live events. Each set of simulation results 280 can identify outcomes of conditional events 275 for a corresponding live event. The results maintainer 230 can manage and update each set of simulation results 280 that are stored within the storage 215. The results maintainer 230 can store, retrieve, delete, modify, or otherwise access each set of simulation results 280 within the storage 215. The results maintainer 230 can handle queries from client devices 220 or computing systems 260 and can provide requested simulation results 280 in response to the query. The results maintainer 230 can initiate an initial set of simulations to be executed for a live event (e.g., at the start of the live event, when requested by a client device 220, computing system 260, etc.).

The results maintainer 230 can generate odds for a live event given one or more selected outcomes for conditional events 275 of the live event. For example, the results maintainer 230 can receive one or more requests for odds for a live event, which can identify one or more selected outcomes for conditional events 275. Upon receiving requests for odds from client devices 220, the results maintainer 230 can access the appropriate set of simulation results 280 for the live event stored in storage 215. The results maintainer 230 can compute the odds for the requested wagers based on these simulations. For example, if a request pertains to the probability of a basketball team leading at halftime, the results maintainer 230 can retrieve the relevant simulations, analyze them, and calculate the odds accordingly. In response to detected changes 270 or specific queries that necessitate updated simulations, the results maintainer 230 can provide a signal/live event state information/live event changes to the simulation executor 245 to execute simulations, as described in further herein.

The change detector 235 can be in continuous communication with the computing system 260 and can serve as a source of data for monitoring various live events. The computing system 260 can provide real-time data and updates about the live events. By receiving data from the computing system 260, the change detector 235 can monitor live events to determine whether additional/replacement simulations are to be executed. The determination can be based on changes in the state of the live event, such as scores, player actions, or any significant incidents that could impact the outcome of the event (e.g., detected changes 270). For example, if a key player in a sporting event is injured, the predicted outcome may be altered, necessitating a re-simulation to reflect the new development. The change detector 235 can determine, based on a change in the live event (e.g., detected changes 270), that the game is to be re-simulated. The change detector 235 can determine that a second set of simulation is to be generated. The determinations of the change detector 235 can be based on detected changes 270. The change detector 235 can continuously monitors live data feeds and detected changes 270 for any changes that may affect the outcome of an event, such as weather, player actions, and scores. When a live event change 270 is detected, the change detector 235 can trigger an update process within the data processing system 205 to reflect this additional information in the simulations.

The change detector can include a set of rule-based criteria to determine when additional simulations of a live event are needed. The rule-based criteria can depend on the type of live event monitored. A typical rule can be, in a non-limiting example, "if the score changes, re-run the simulation." The rule-based criteria can be different for different live events or different types of sports. The rule-based criteria can be designed to identify significant changes that can potentially alter the outcome of the event. In different types of events, the rules can be configured to respond to the most impactful factors, like goals in football, set points in tennis, or lead changes in a race. For example, during a soccer match, an additional rule can be, in another non-limiting example, "if a penalty kick is awarded or a red card is issued, rerun the simulation." The change detector 235 can prioritize which detected changes 270 are significant enough to warrant a re-simulation, optimizing the system's resources and response times. The change detector 235 can adaptively set thresholds for what constitutes significant detected changes 270, based on historical data and the context of each live event or conditional event 275. The change detector 235 can receive from the client device 220 or computing system 260 a request to manually initiate re-running some or all of simulations for one or more live events.

In some implementations, the change detector 235 can detect the change in the live event based on a message from one or more external computing systems. The change detector 235, via the network 210, can receive and process messages from a variety of external computing systems including client devices 220 and computing systems 260. The messages can include data from sports data feeds, weather services, news outlets, or other specialized systems that provide updates on live events or conditional event 275.

The simulation results 280 can include outcomes from a series of predictive simulations (or models) that have been run based on various scenarios of a live event. When initially performing the simulations, the simulations can encompass a wide array of potential outcomes for numerous conditional events 275 that can occur during the live event. The conditional events 275 can include pre-defined scenarios. Each simulation result within the set of simulation results 280 can be associated with a prediction for a specific conditional event 275, such as which player will score the next goal in a soccer match or whether there will be a successful field goal in a football game. The outcomes predicted in the simulation results 280 can be not static; the outcomes can be influenced by the detected changes 270. For example, if the change detector 235 determines that a player of a basketball team is injured during a game, this detected changes 270 can affect the outcome of conditional events 275 related to that player's performance. As live events unfold and detected changes 270 are detected (e.g., weather conditions worsening or a player receiving a red card), the simulation results 280 can be updated to reflect how the detected changes 270 influence the outcomes of the ongoing conditional events 275.

If it is determined that additional or replacement simulation results are to be generated for a live event, the result identifier 240 can identify, based on the live event change 270 for the live event, a subset 285 of the set of simulation results 280 corresponding to the live event that identify an outcome of a conditional event 275 corresponding to the live event change 270. Upon detecting a change via the change detector 235, the result identifier 240 can select a subset 285 of the simulation results 280 for the live event that includes simulated outcomes of certain conditional events 275 that are still valid following the live event change(s) 270 in the live event detected by the change detector 235. By identifying the subset 285, the result identifier 240 can enable the data processing system 205 to cache and reuse the simulation results 280 that are not impacted by the detected changes 270. This caching process eliminates the requirement that the data processing system re-process all simulation results 280 for the live event. The set of simulation results 280 for the live event can include a predetermined number of simulations designed to cover a comprehensive range of possible scenarios for the event. For example, during a soccer match, if a goal is scored in the first half, the result identifier 240 can analyze the simulation results 280 to identify and extract the subset 285 that specifically pertains to scenarios (e.g., predicted the timing and score of the goal) influenced by the goal to reflect the new scoreline. Instead of re-running all set of simulation results 280 in, the system focuses only on updating those affected by the change in the live event, ensuring efficiency and relevance in its predictive modeling.

The result identifier 240, via the change detector 235, can identify the conditional event or outcome that has been triggered by the live event change 270. For instance, in a soccer match, if a goal is scored, the result identifier 240 can recognize this as a specific conditional event that can affect the game's outcome. The result identifier 240 can iterate through the set of simulation results 280, which includes a predetermined number of simulations covering a wide range of scenarios for the event. During the iteration, the result identifier 240 can scan each simulation to identify the results that include the specific conditional event identified. When the relevant simulations are identified, the result identifier 240 can flag these results for inclusion in the subset 285.

The result identifier 240 can identify, for inclusion in the subset 285, each simulation result of the first set of simulation results 280 that identify a simulated outcome that matches the outcome of the conditional event 275 corresponding to the live event. For example, if a conditional event 275 is "Team A scores the first goal", the result identifier 240 can select simulation results 280 where Team A scores the first goal and add them to the subset 285. In another example, in a football game, if a player is injured and removed from the game, the result identifier 240 can select, to be included in the subset 285, simulation results 280 that are related to the team's performance without that player at the time after the player is removed from the game.

The result identifier 240 can receive signals from the change detector 235 that indicates updates to the live event (e.g., detected changes 270 corresponding to the live event). The result identifier 240 can dynamically adjust the subset of simulation results 280 in response to the detected changes 270 (e.g., yellow cards, injuries, additional goals, particular plays, or player actions, etc.), ensuring that the latest and most relevant data is included in the subset. Each time additional simulations are executed in response to detected changes, the result identifier 240 can continuously select new subsets from the simulation results after executing the additional simulations and upon detecting further detected changes 270. For example, whenever the change detector 235 identifies that the live event is to be at least partially re-simulated based on detected changes 270 (e.g., yellow cards or injuries, any other change in the live event, etc.), the result identifier 240 can update the subset 285 to reflect the changes using the techniques described herein.

The result identifier 240 can cache certain simulation results 280 as the subset 285. The cached subset 285 can be re-used even after the detected changes 270 have been detected for the live event to which the subset 285 corresponds, thereby improving computational efficiency by eliminating the requirement that all simulation results 280 for the live event be regenerated. As described herein, the result identifier 240 can determine that one or more simulation results 280 are to be cached as part of the subset 285 in response to corresponding signals from the change detector 235. Each result in the subset 285 can be stored in association with a flag indicating that each simulation result of the subset 285 is to be cached based on the change in the live event (e.g., detected changes 270). The flag can include a marker, label, or signal. For example, the flag could be set to true to indicate that the simulation results 280 in the subset 285 are relevant due to detected changes 270.

In some implementations, caching can include the process of storing frequently accessed data in a temporary storage space to allow quicker retrieval. By flagging a portion of simulation results 280 for caching as the subset 285, the result identifier 240 can ensure that the subset 285 data is stored in a manner that allows for faster access. The flagged data in the cache can be stored in a memory space that is quicker to access than the main database storage 215, ensuring that any subsequent requests for this data can be served rapidly. The flag mechanism can ensure that the simulations maintain flexibility and responsiveness to varying requirements of each conditional event 275 and can optimize accuracy and computational efficiency.

Executing the simulations can executing algorithms, parameters, and/or configurations to generate predicted outcomes of live events, which may be stored as part of the simulation results 280 for the live event. The simulations can include, but are not limited to, Monte Carlo simulations, regression models, decision trees, neural networks, deep learning networks, time series models, reinforcement learning models, or ensemble methods. The simulations may include executing trained machine-learning models, which can include linear regression models, logistic regression models, support vector machine models, and random forest models. The simulation output can include probabilities or odds values for one or more outcomes of conditional events 275 that are yet to occur in the live event. After the simulations are executed, the simulation output can be stored in the storage 215 as part of the simulation results 280, in association with an identifier of the live event for which the simulations were executed. As described herein, the simulation results 280 for the live event generated by executing the simulations can include the predictions, probabilities or odds values, scores, evaluations, and any other output corresponding to an outcome that may occur during the live event.

Once the subset 285 has been identified and stored, the simulation executor 245 can execute the first set of simulations of the live event. The first set of simulations can include a predetermined number of simulations. The simulation executor 245 can execute the simulation within an execution environment. The simulation executor 245 can operationalize the simulation by using a set of inputs to generate candidate data points for the live events. In some implementations, the simulation executor 245 may be implemented in whole or in part in a specialized, isolated computing environment, such as a container, virtual machine, or a dedicated software environment. This can ensure that the optimization process can be executed in a controlled and secure setting and can minimize interference with other system operations and enhance overall computational efficiency and reliability. The inputs can include various real-time data points such as game scores, player performance statistics, environmental conditions, and other relevant information about the live event.

The simulation executor 245 can execute a number of second simulations of the live event. The number of second simulations of the live event can be determined based on a number of simulation results in the subset 285. The result identifier 240 can determine the number of the second simulations to execute based on a difference between a number of results in the first set of simulation results 280 and the number of results in the subset 285. The result identifier 240 can compares the total number of results in the set of simulation results 280 previously generated for the live event prior to detecting the live event change 270, with the number of results in the subset 285 and then quantify how many additional simulations (the second set of simulations) need to be executed. The result identifier 240 can calculate the difference between the first set of simulation results 280 and the subset 285. The result identifier 240 can uses the discrepancy to determine the number of additional simulations needed and can be based on several factors, including the nature of the detected changes 270, historical data, the difference, and computational resources available.

For example, the data processing system 205 can initially perform the first set of simulation results 280 of 10,000 simulations that cover a broad range of scenarios for a live event. Detected changes 270 can occur (e.g., an unexpected player injury). In response, the result identifier 240 can identify a subset (subset 285) of 3,000 simulations that remain relevant after the detected changes 270. The subset 285 of 3,000 simulations represents 30% of the original 10,000 simulations in this example, where the 3,000 simulation results are still valid for future probabilities or odds calculations even following the detected live event change 270 for the live event. The result identifier 240 can calculate that an additional 4,500 simulations are to be executed to maintain a predetermined number of valid, up-to-date simulation results for the live event.

In another example, in a basketball game, if a detected live event change 270 indicates that a participant in the basketball game is unexpectedly benched due to injury, the results identifier 240 can select simulations results 280 of the basketball game for inclusion in a corresponding subset 285 that include said player being benched/injured for the rest of the basketball game. Furthering this example, if the first set of simulation results 280 includes 10,000 simulations and the subset 285 includes 4,000 simulations, the results identifier 240 can generate a signal to execute additional simulations (e.g., second simulations of the live event) to replace results in the first set of simulations that were not selected for inclusion in the subset, due to their results being invalid (in this example, 6,000 remaining simulations).

The simulation executor 245 can generate a second set of simulation results 280 that include the subset 285 of the first set of simulation results 280 and results of the second simulations of the live event. For example, in a soccer match, if a player receives a red card, the simulation executor 245 can simulate the second simulations to generate additional simulation results 280 that include game outcomes considering the team's performance with one fewer player (the player removed due to due to receiving the red card). The second simulations can be combined with any the simulation results flagged for inclusion in the subset 285, which are cached because they still apply to the current game state and are therefore usable to generate odds or predictions relating to the live event. The result identifier 240 can delete the simulation results that are not included in the subset 285 prior to, or in some implementations upon, executing the second simulations to generate the second simulation results 280 for the live event.

The simulation executor 245 can receive a request (e.g., from client device 220 or computing system 260) for probabilities or odds specifying one or more conditional events 275. Once up-to-date simulation results 280 are generated for the live event (which may include results in the subset 285), the simulation results 280 can be used to generate probabilities or odds or other predictions for the live event, for example, in response to a request for odds for a wager. For example, the simulation executor 245 can determine the odds for the wager based on a number of the second set of simulation results 280 that identify the outcome for the conditional event 275. The simulation executor 245 can assess the second set of simulation results 280, which includes updated predictions based on detected changes 270. The simulation executor 245 can assess the probabilities and calculate the probabilities or odds associated with the conditional events 275 based on the second set of simulation results 280. To calculate the probabilities or odds, the simulation executor 245 can calculate the likelihood of each event occurring, based on the data from the second set of simulation results 280. The simulation executor 245 can analyze how often a particular outcome appears in the second set of simulation results 280. For instance, if a conditional event 275 (like Team A scoring the next goal) occurs in 300 out of 1,000 simulations, the probability of that event is calculated as 300/1,000 or 30%.

In some implementations, the simulation executor 245 can generate a set of simulation results 280 for a live event by executing simulations of the live event. A simulation of a live event can be a model of the event and can produce one or more outputs that correspond to various outcomes of the live event. For example, if the live event is a sporting event, the outcomes may include timestamps of simulated game events (e.g., points scored, passes made, etc.), along with identifiers of participants (e.g., athletes) that performed the simulated game event. Executing the simulations can include executing processor-readable instructions that cause the simulation executor 245 to carry out a model of the live event, with the outputs of the simulation being respective simulation results for each conditional event 275 of the live event, as described herein. Each simulation used to generate the simulation results may depend partially on an element of randomness (e.g., one or more random numbers generated using one or more random number generators), and may be based on various aspects of the particular live event, such as the teams and athletes participating in the live event or any other attribute or characteristic that may influence any outcome that may occur during the live event. As such, the simulation results generated from each simulation may include different outcomes for the conditional events 275 of the simulated live event.

Figure 3:
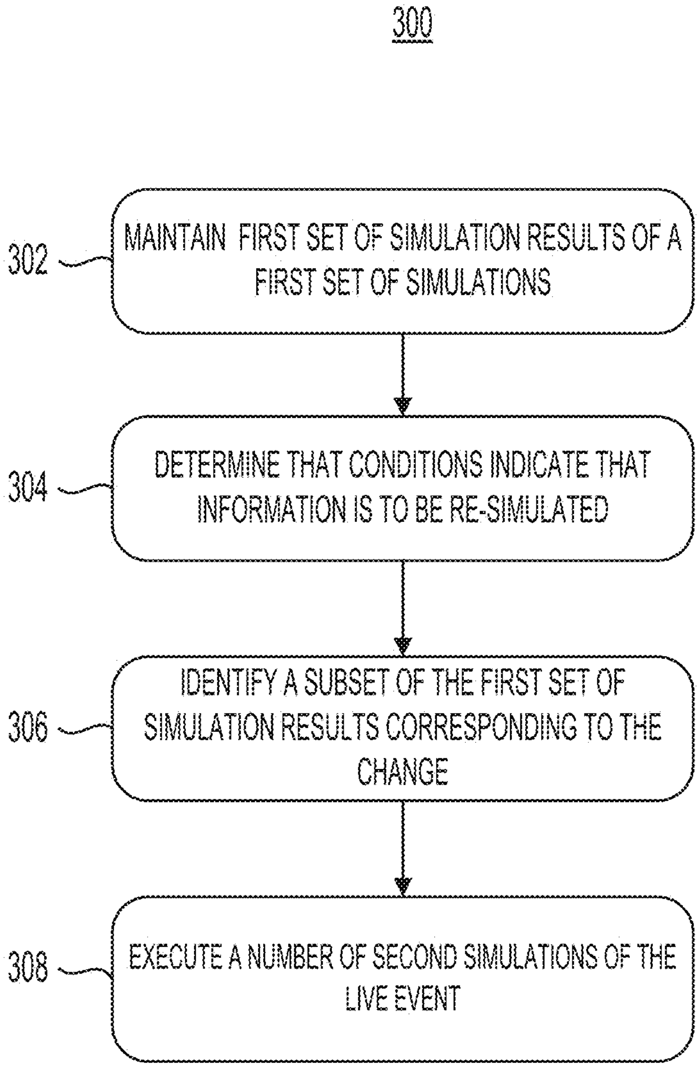
FIG. 3 illustrates an example flow diagram of a method for simulation reuse, in accordance with one or more implementations.

Referring to FIG. 3, illustrated is an example flow diagram of a method 300 for simulation reuse, in accordance with one or more implementations. In brief overview of the method 300, the data processing system (e.g., the data processing system 105, etc.) can maintain a first set of simulation results of a first set of simulations (STEP 302), determine that conditions indicate that information is to be re-simulated (STEP 304), identify a subset of the first set of simulation results identifying an outcome of a conditional event corresponding to the change (STEP 306), and execute a number of second simulations of the live event based on a number of simulation results in the subset (STEP 308).

In further detail of method 300, at STEP 302, the data processing system can maintain the first set of simulation results of a first set of simulations of a live event. The first set of simulation results can identify outcomes of conditional events for the live event.

At STEP 304, the data processing system can determine, based on a change in the live event, that the game is to be re-simulated. The data processing system can detect the change in the live event based on a message from one or more external computing systems. The data processing system can receive a request for probabilities or odds for a wager corresponding to the live event.

At STEP 306, the data processing system can, responsive to determining that the second set of simulation is to be generated, identify, based on the change in the live event, a subset of the first set of simulation results corresponding to the change. Each result of the subset can identify an outcome of a conditional event that matches and/or corresponds to at least one criterion. The at least one criterion can be, for example, a condition of the live that was predicted to occur in the subset of simulation results matching a corresponding event that actually occurred in the event. The request can identify a first outcome for a first conditional event corresponding to the live event. The subset can be stored in association with a flag indicating that each simulation result of the subset is to be cached based on the change in the live event. The data processing system can delete the first set of simulations not included in the subset upon executing the second simulations. The data processing system can identify, for inclusion in the subset, each simulation result of the first set of simulation results that identify a simulated outcome that matches the outcome of the conditional event. The first set of simulations can include a predetermined number of simulations. The data processing system can determine the number of the second simulations to execute based on a difference between a number of results in the first set of simulation results and the number of results in the subset.

At STEP 308, the data processing system can execute a number of second simulations of the live event. The number determined can be based on a number of simulation results in the subset. The data processing system can generate a second set of simulation results including the subset of the first set of simulation results and results of the second simulations of the live event. The data processing system can generate the probabilities or odds for the wager based on the second set of simulation results. The data processing system can determine the probabilities or odds for the wager based on a number of the second set of simulation results that identify the outcome for the conditional event. The data processing system can execute the first set of simulations of the live event.

In some implementations, the systems and methods of this technical solution provide techniques for caching and re-using simulation results to improve computational efficiency of re-simulating live events. For example, the systems and methods described herein can execute simulations of live events. Simulation results generated according to the techniques described herein can be selectively cached and re-used to improve the computational efficiency of predictions of probabilities of various outcomes or occurrences to potentially occur within the one or more live events. As described herein, conventional approaches for live event simulations can involve periodically re-executing entire sets of simulations as live events unfold, leading to higher computational demands and slower response times. These problems compound if circumstances are such that simulations are to be re-executed frequently (e.g., live events or associated information changes rapidly, and simulations are recomputed at a frequent rate, etc.). The systems and methods described herein provide techniques for dynamically selecting simulation results that are still relevant after determining that simulations are to be re-executed. Such approaches result in more responsive generation of simulation results, significantly improving performance of simulation computing systems. The systems and methods described herein therefore provide a technical improvement over conventional computing systems that execute simulations.

At least one other aspect of the present disclosure is directed to a system. The system can maintain a first set of simulation results of a first set of simulations of a live event. The first set of simulation results can identify outcomes of conditional events for the live event. The system can determine, based on a change in the live event, that the game is to be re-simulated. The system can, responsive to determining that the second set of simulation is to be generated, identify, based on the change in the live event, a subset of the first set of simulation results identifying an outcome of a conditional event corresponding to the change. The system can execute a number of second simulations of the live event. The number determined can be based on a number of simulation results in the subset.

In some implementations, the system can generate a second set of simulation results including the subset of the first set of simulation results and results of the second simulations of the live event. In some implementations, the system can receive a request for odds for a wager corresponding to the live event. In some implementations, the system can generate the odds for the wager based on the second set of simulation results. In some implementations, the request can identify a first outcome for a first conditional event corresponding to the live event. In some implementations, the system can determine the odds for the wager based on a number of the second set of simulation results that identify the outcome for the conditional event.

In some implementations, the subset can be stored in association with a flag indicating that each simulation result of the subset is to be cached based on the change in the live event. In some implementations, the system can delete the first set of simulations not included in the subset upon executing the second simulations. In some implementations, the system can identify, for inclusion in the subset, each simulation result of the first set of simulation results that identify a simulated outcome that matches the outcome of the conditional event. In some implementations, the system can determine the number of the second simulations to execute based on a difference between a number of results in the first set of simulation results and the number of results in the subset. In some implementations, the system can execute the first set of simulations of the live event. The first set of simulations can include a predetermined number of simulations. In some implementations, the system can detect the change in the live event based on a message from one or more external computing systems.

At least one aspect of the present disclosure relates to a method. The method can be performed, for example, by one or more processors coupled to a non-transitory memory. The method can include maintaining a first set of simulation results of a first set of simulations of a live event. The first set of simulation results can identify outcomes of conditional events for the live event. The method can include determining based on a change in the live event, that the game is to be re-simulated. The method can include, responsive to determining that the second set of simulation is to be generated, identifying based on the change in the live event, a subset of the first set of simulation results identifying an outcome of a conditional event corresponding to the change. The method can include executing a number of second simulations of the live event. The number determined can be based on a number of simulation results in the subset.

In some implementations, the method can include generating a second set of simulation results including the subset of the first set of simulation results and results of the second simulations of the live event. In some implementations, the method can include receiving a request for odds for a wager corresponding to the live event. In some implementations, the method can include generating the odds for the wager based on the second set of simulation results. In some implementations, the request can identify a first outcome for a first conditional event corresponding to the live event. In some implementations, the method can include determining the odds for the wager based on a number of the second set of simulation results that identify the outcome for the conditional event.

In some implementations, the method can include the subset stored in association with a flag indicating that each simulation result of the subset is to be cached based on the change in the live event. In some implementations, the method can include deleting the first set of simulations not included in the subset upon executing the second simulations. In some implementations, the method can include identifying, for inclusion in the subset, each simulation result of the first set of simulation results that identify a simulated outcome that matches the outcome of the conditional event. In some implementations, the method can include determining the number of the second simulations to execute based on a difference between a number of results in the first set of simulation results and the number of results in the subset. In some implementations, the method can include executing the first set of simulations of the live event. The first set of simulations can include a predetermined number of simulations. In some implementations, the method can include detecting the change in the live event based on a message from one or more external computing systems.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, e.g., one or more components of computer program instructions, encoded on computer storage medium for execution by, or to control the operation of, data processing apparatus. The program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of these. Moreover, while a computer storage medium is not a propagated signal, a computer storage medium can include a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The terms "data processing apparatus", "data processing system", "client device", "computing platform", "computing device", or "device" encompasses all kinds of apparatus, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of these. The apparatus and execution environment can realize various different computing model infrastructures, such as web services, distributed computing, and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA or an ASIC.

Processors suitable for the execution of a computer program include, by way of example, both general and special purpose microprocessors, and any one or more processors of any kind of digital computer. Generally, a processor can receive instructions and data from a read-only memory or a random-access memory or both. The elements of a computer include a processor for performing actions in accordance with instructions and one or more memory devices for storing instructions and data. Generally, a computer can also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a player, implementations of the subject matter described in this specification can be implemented on a computer having a display device, e.g., a CRT (cathode ray tube), plasma, or LCD (liquid crystal display) monitor, for displaying information to the player and a keyboard and a pointing device, e.g., a mouse or a trackball, by which the player can provide input to the computer. Other kinds of devices can be used to provide for interaction with a player as well; for example, feedback provided to the player can include any form of sensory feedback, e.g., visual feedback, auditory feedback, or tactile feedback; and input from the player can be received in any form, including acoustic, speech, or tactile input. In addition, a computer can interact with a player by sending documents to and receiving documents from a device that is used by the player; for example, by sending web pages to a web browser on a player's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a player can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as the gaming system described herein can include clients and servers. For example, the gaming system can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving input from a player interacting with the client device). Data generated at the client device (e.g., a result of an interaction, computation, or any other event or computation) can be received from the client device at the server, and vice-versa.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the gaming system could be a single module, a logic device having one or more processing modules, one or more servers, or part of a search engine.

Having now described some illustrative implementations, it is apparent that the foregoing is illustrative and not limiting, having been presented by way of example. In particular, although many of the examples presented herein involve specific combinations of method acts or system elements, those acts, and those elements may be combined in other ways to accomplish the same objectives. Acts, elements, and features discussed only in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations, elements, or acts of the systems and methods herein referred to in the singular may also embrace implementations including a plurality of these elements; and any references in plural to any implementation, element, or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation," or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description, or any claim are followed by reference signs, the reference signs have been included for the sole purpose of increasing the intelligibility of the drawings, detailed description, and claims. Accordingly, neither the reference signs nor their absence has any limiting effect on the scope of any claim elements.

The systems and methods described herein may be embodied in other specific forms without departing from their characteristics thereof. The systems and methods described herein may be applied to other environments. The foregoing implementations are illustrative, rather than limiting, of the described systems and methods. The scope of the systems and methods described herein may thus be indicated by the appended claims, rather than the foregoing description, and changes that come within the meaning and range of equivalency of the claims are embraced therein.

What is claimed is:

1. A system, comprising:

one or more processors coupled to non-transitory memory, the one or more processors configured to:

maintain a first set of simulation results of a first set of simulations executed at a first time, the first set of simulation results generated in response to a first network communication;

based on a second network communication, determine that re-simulation for an event is to occur;

responsive to determining, based on the second network communication, that re-simulation for the event is to occur, identify, based on the second network communication, a subset of the first set of simulation results identifying at least one characteristic that is to be cached according to at least one criterion; and execute a number of second simulations for the event, the number determined based on a number of simulation results in the subset.

2. The system of claim 1, wherein the one or more processors are further configured to generate a second set of simulation results including the subset of the first set of simulation results and results of the second simulations.

3. The system of claim 1, wherein the one or more processors are further configured to:

receive a network request for a set of values corresponding to the event; and generate the set of values based on the second simulations.

4. The system of claim 1, wherein the first network communication or the second network communication are received via a client device.

5. The system of claim 1, wherein the subset is stored in association with a flag indicating that each simulation result of the subset is to be cached.

6. The system of claim 1, wherein the one or more processors are further configured to delete the first set of simulations not included in the subset upon executing the second simulations.

7. The system of claim 1, wherein the one or more processors are further configured to identify, for inclusion in the subset, each simulation result of the first set of simulation results that identify a simulated outcome that corresponds to the at least one criterion.

8. The system of claim 1, wherein the one or more processors are further configured to determine the number of the second simulations to execute based on a difference between a number of results in the first set of simulation results and the number of results in the subset.

9. The system of claim 1, wherein the one or more processors are further configured to execute a predetermined number of the first set of simulations.

10. The system of claim 1, wherein the one or more processors are further configured to determine that the first network communication includes an indication to execute the first set of simulations.

11. A method, comprising:

maintaining, by one or more processors coupled to non-transitory memory, a first set of simulation results of a first set of simulations executed at a first time, the first set of simulation results generated in response to a first network communication;

determining, by the one or more processors based on a second network communication, that re-simulation for an event is to occur;

responsive to determining, by the one or more processors, based on the second network communication that re-simulation for the event is to occur, identifying, by the one or more processors based on the second network communication, a subset of the first set of simulation results identifying at least one characteristic that is to be cached according to at least one criterion; and executing, by the one or more processors, a number of second simulations for the event, the number determined based on a number of simulation results in the subset.

12. The method of claim 11, further comprising generating, by the one or more processors, a second simulation result including the subset of the first set of simulation results and results of the second simulations.

13. The method of claim 11, further comprising:

receiving, by the one or more processors, a network request for a set of values corresponding to the event; and generating, by the one or more processors, the set of values based on the second simulations.

14. The method of claim 11, wherein the first network communication or the second network communication are received via a client device.

15. The method of claim 11, wherein the subset is stored by the one or more processors in association with a flag indicating that each simulation result of the subset is to be cached.

16. The method of claim 11, further comprising deleting, by the one or more processors, the first set of simulations not included in the subset upon executing the second simulations.

17. The method of claim 11, further comprising identifying, by the one or more processors for inclusion in the subset, each simulation result of the first set of simulation results that identify a simulated outcome that corresponds to the at least one criterion.

18. The method of claim 11, further comprising determining, by the one or more processors, the number of the second simulations to execute based on a difference between a number of results in the first set of simulation results and the number of results in the subset.

19. The method of claim 11, wherein the one or more processors further execute a predetermined number of the first set of simulations.

20. The method of claim 11, further comprising determining, by the one or more processors, that the first network communication includes an indication to execute the first set of simulations.

* * * * *